(12) United States Patent
Doell et al.

(10) Patent No.: US 9,238,186 B2
(45) Date of Patent: Jan. 19, 2016

(54) CONTAMINATED WATER TREATMENT SYSTEM, METHOD AND APPARATUS

(75) Inventors: Keith Doell, Lethbridge (CA); Kyle Trainor, Golden, CO (US)

(73) Assignee: RESIRKULERE CANADA LTD., Stettler (CA)

( * ) Notice: Subject to any disclaimer, the term of this patent is extended or adjusted under 35 U.S.C. 154(b) by 889 days.

(21) Appl. No.: 13/223,217

(22) Filed: Aug. 31, 2011

(65) Prior Publication Data

US 2013/0032531 A1     Feb. 7, 2013

Related U.S. Application Data

(60) Provisional application No. 61/515,529, filed on Aug. 5, 2011.

(51) Int. Cl.
| | | |
|---|---|---|
| *B01D 21/02* | (2006.01) | |
| *B01D 21/24* | (2006.01) | |
| *B01D 21/26* | (2006.01) | |
| *B01D 17/02* | (2006.01) | |
| *B01D 17/038* | (2006.01) | |

(52) U.S. Cl.
CPC ............ *B01D 21/10* (2013.01); *B01D 17/0208* (2013.01); *B01D 17/0217* (2013.01); *B01D 21/245* (2013.01); *B01D 21/2444* (2013.01); *B01D 21/267* (2013.01)

(58) Field of Classification Search
CPC .............. B01D 21/10; B01D 17/0208; B01D 17/0217; B01D 21/267; B01D 21/2444; B01D 21/245
USPC ..................... 210/512.1, 532.1, 538
See application file for complete search history.

(56) References Cited

U.S. PATENT DOCUMENTS

| 6,432,298 B1 * | 8/2002 | Carvalko, Jr. | ............... 210/512.1 |
|---|---|---|---|
| 6,588,601 B1 * | 7/2003 | Costinel | ..................... 210/512.1 |

* cited by examiner

*Primary Examiner* — David A Reifsnyder
(74) *Attorney, Agent, or Firm* — Sander R. Gelsing

(57) ABSTRACT

In one aspect the invention provides a fluid treatment apparatus for treating contaminated fluid. The apparatus comprises a container having base member and a peripheral containment wall and defining a total interior volume. The apparatus further comprises at least one container inlet to receive said contaminated fluid, at least one container outlet to discharge water separated from said contaminated fluid, a separation region suitable to receive said contaminated fluid, to allow separation of said contaminated fluids into less dense contaminants, water and denser contaminants, and to store said denser contaminants as a sediment layer on the base member. The apparatus further comprises a water collection region suitable to receive water from the separation region and direct said water to said at least one container outlet, and an oil collection region, suitable to receive less dense contaminants from the separation region.

7 Claims, 13 Drawing Sheets

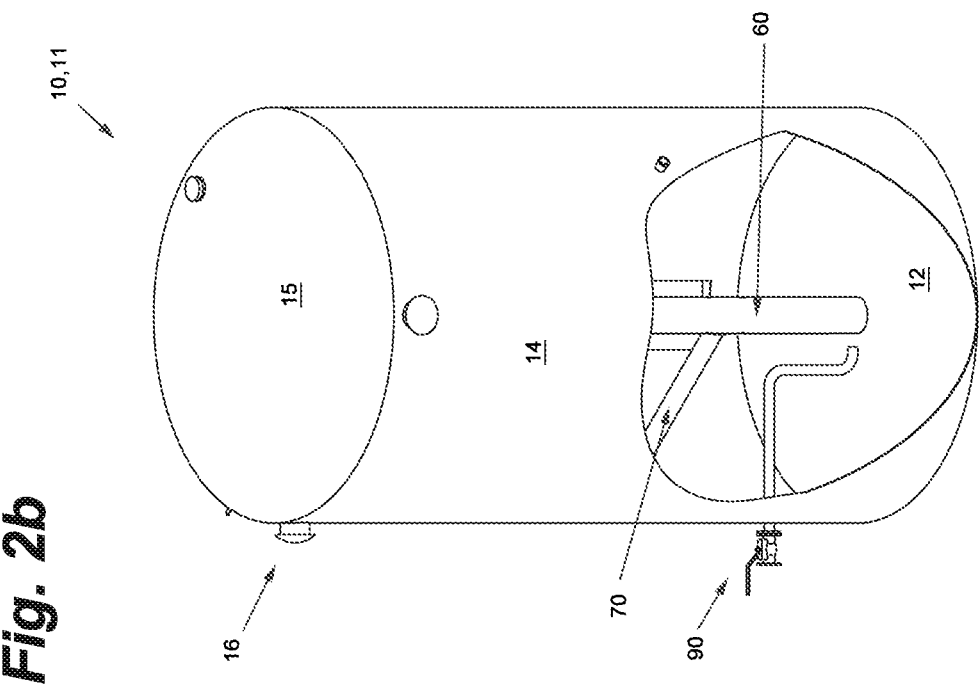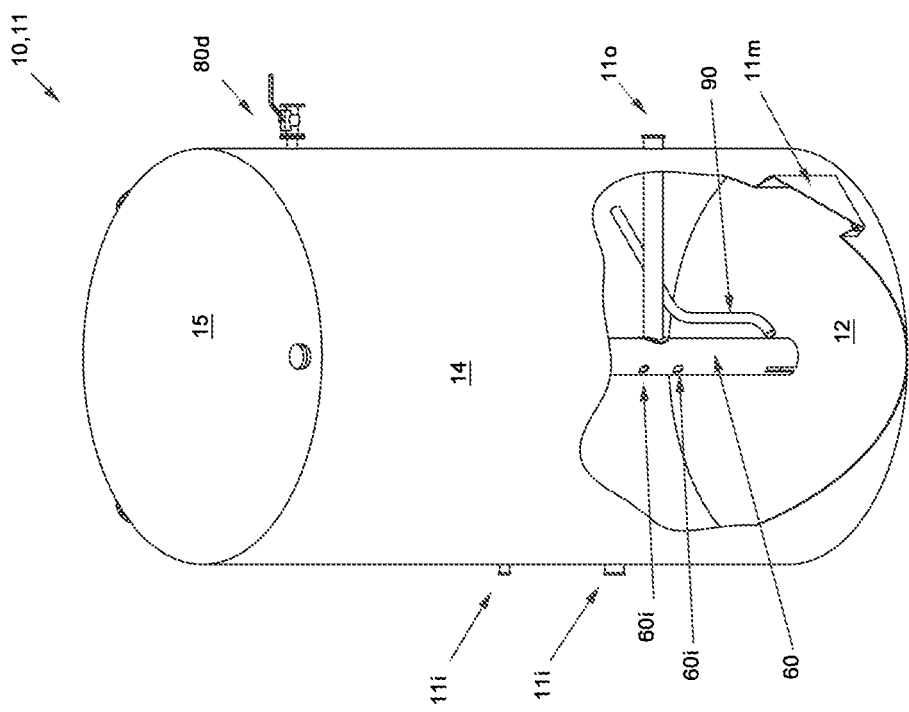

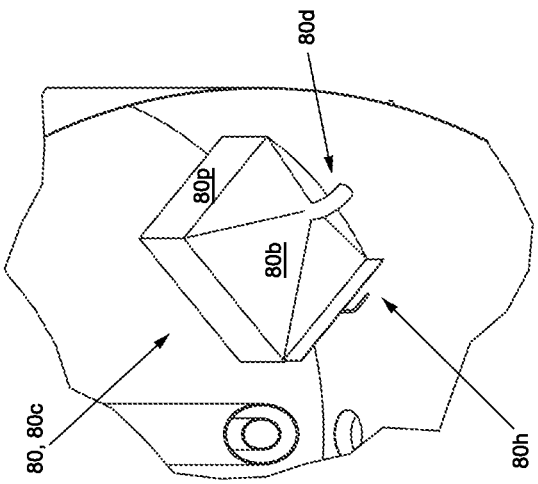
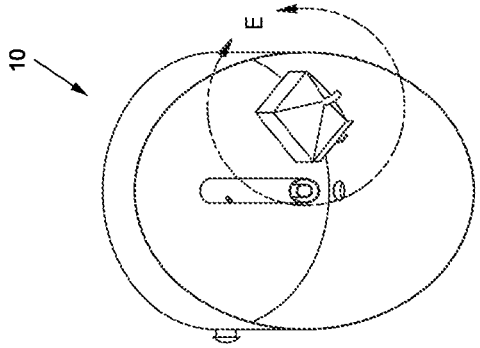
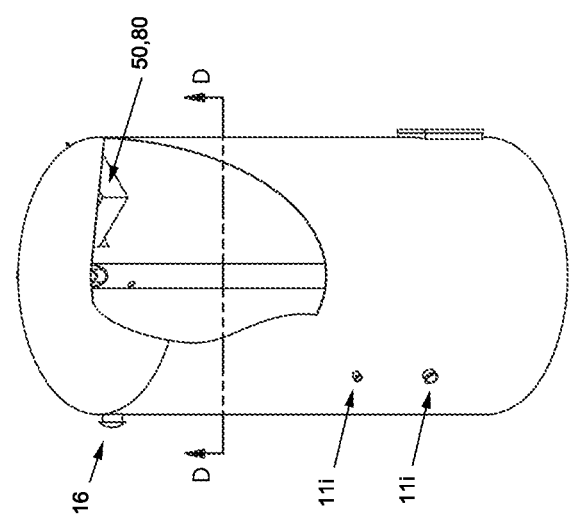

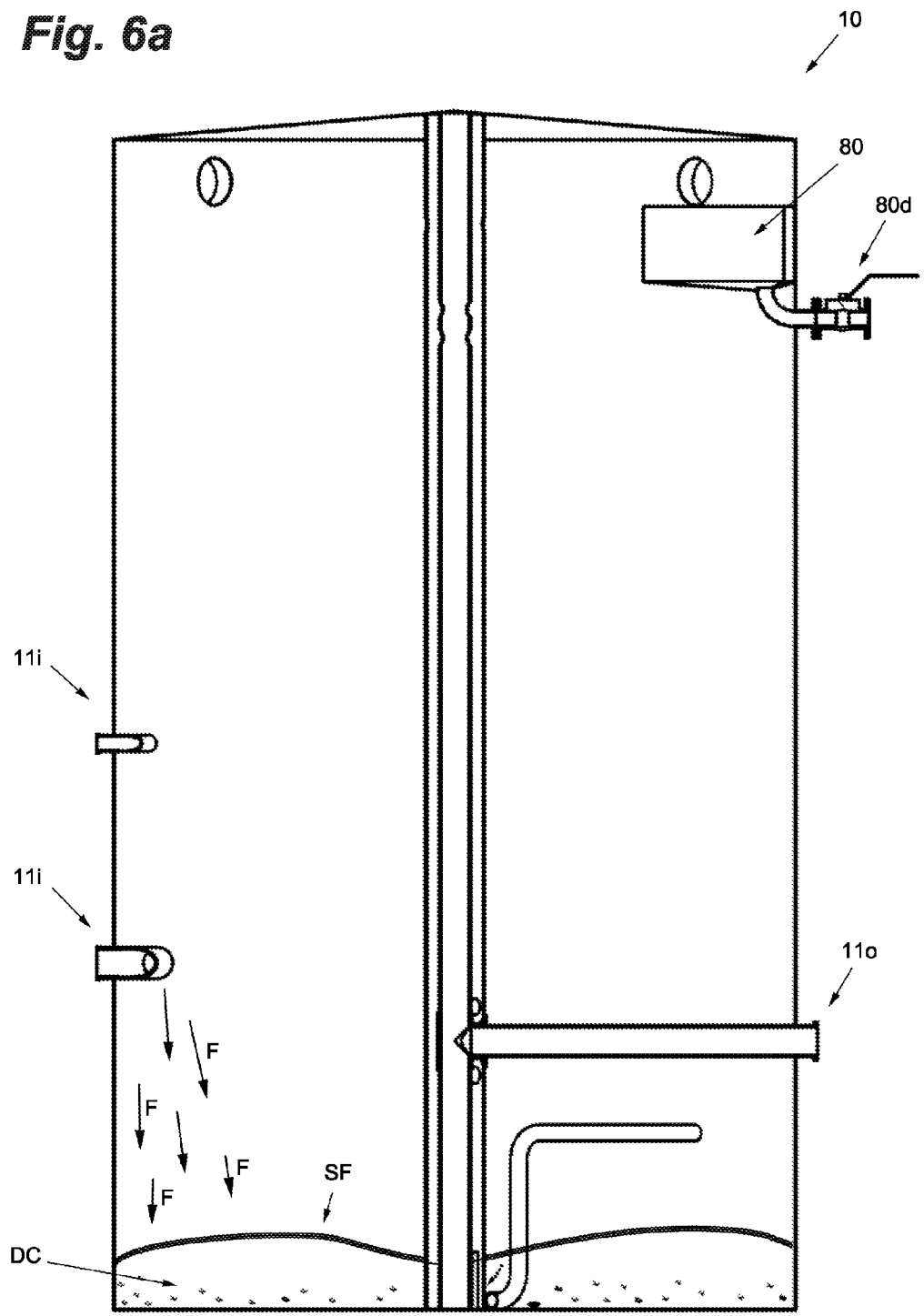

US 9,238,186 B2

CONTAMINATED WATER TREATMENT SYSTEM, METHOD AND APPARATUS

CROSS REFERENCE TO RELATED APPLICATION

This application is a regular application of U.S. Provisional Patent Application Ser. No. 61/515,529 filed Aug. 5, 2011 and entitled, "CONTAMINATED WATER TREATMENT SYSTEM, METHOD AND APPARATUS", the entirety of which is incorporated herein by reference.

FIELD OF THE INVENTION

The present invention relates to a contaminated water treatment system, method and apparatus. More particularly, the invention relates to a contaminated water treatment system, method and apparatus to separate oil from contaminated waste water produced during oil and gas well drilling operations.

BACKGROUND OF THE INVENTION

In an oil well fracturing (also known as "fracing") or other stimulation procedures, as well in general oil and gas well exploration, drilling or service operations, significant quantities of contaminated fluids, such as waste water, produced water, fracturing fluids or other contaminated fluids are often produced as a by-product of such operations. These contaminated fluids, in the well drilling sector, often contains many heavy solids, such as sand, proppants, sawdust, clay and gravel, as well as fluid contaminants, such as oils and other hydrocarbons. Containment and disposal of these contaminated fluids is expensive, especially where such fluids have to be transported off-site for subsequent treatment and/or disposal (such as downhole disposal). Moreover, additional fresh water will often have to be supplied to replace the loss in fluid volume due to removal and disposal of the contaminated fluids.

As such the prior art teaches various systems and apparatus for treatment of these contaminated fluids, such as various membrane filter based technologies to remove the various contaminants from the contaminated fluids, so as to allow these fluids to be recycled back into the oilfield operations, rather than being disposed. However, a significant problem with such membrane filter based technologies is that contaminants, such as fracing gels, sands, proppants, oils and other hydrocarbons, will fill up or clog these filters at a rate that is far too fast to allow for these membrane filters to be used economically and/or efficiently.

As such, there remains a need for a safe, simple and efficient system, method and apparatus for treating contaminated fluids from oilfield operations and for subsequent introduction of such treated fluids back into the oilfield operations, rather than disposing same and requiring additional uncontaminated or fresh sources of such fluids.

BRIEF DESCRIPTION OF THE DRAWINGS

Embodiments of the invention will now be described, by way of example only, with reference to the accompanying drawings, wherein:

FIG. 1b is a rear isometric view of the embodiment of FIG. 1a;

FIG. 2a is a front cutaway isometric view of the embodiment of FIG. 1a;

FIG. 2b is a rear cutaway isometric view of the embodiment of FIG. 1a;

FIG. 3a is top view of the embodiment of FIG. 1a;

FIG. 3b is a sectioned perspective view of the embodiment of FIG. 1a along line A-A of FIG. 3a;

FIG. 3d is a sectioned perspective view of the embodiment of FIG. 1a along line B-B of FIG. 3a;

FIG. 4a is a cutaway isometric view of the embodiment of FIG. 1a;

FIG. 4b is a sectioned perspective view of the embodiment of FIG. 1a along line D-D of FIG. 4a;

FIG. 4c is an enlarged view of the circled area E in FIG. 4b;

FIG. 4d is a cutaway isometric view of the embodiment of FIG. 1a;

FIGS. 5a-5c are various sectioned perspective views of the embodiment of FIG. 1a; and FIGS. 6a-6e are various sectioned perspective views of the embodiment of FIG. 1a, showing the invention at various stages of operation.

DETAILED DESCRIPTION OF THE PREFERRED EMBODIMENTS

Figure 1A:
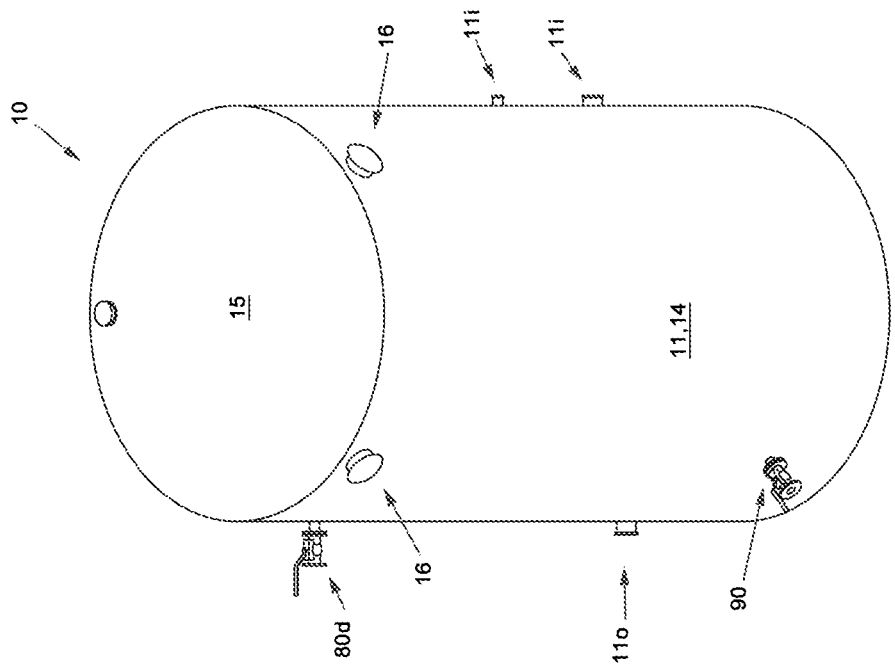
FIG. 1a is front isometric view of an embodiment of the invention.
Figure 1B:
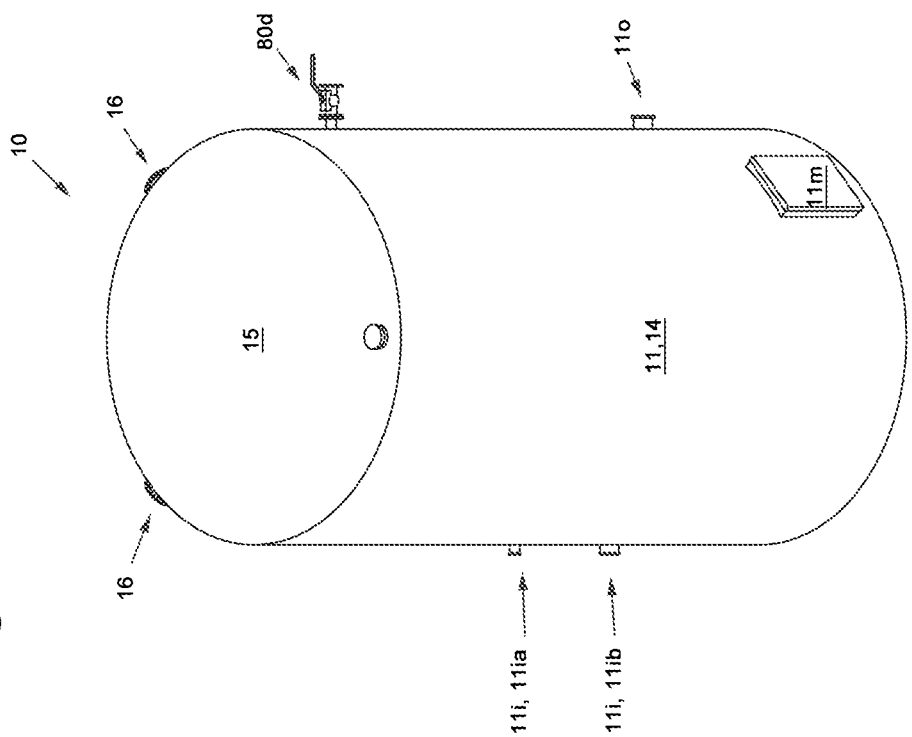

The following description is of a preferred embodiment by way of example only and without limitation to the combination of features necessary for carrying the invention into effect. Reference is to be had to the Figures in which identical reference numbers identify similar components. The drawing figures are not necessarily to scale and certain features are shown in schematic or diagrammatic form in the interest of clarity and conciseness.

Referring now in detail to the accompanying drawings, there is illustrated an exemplary embodiment of apparatus, method and system according to the present invention, the apparatus generally referred to by the numeral 10.

Referring now to FIGS. 1a-6e, the fluid treatment apparatus 10 for treating contaminated fluid F comprises a container 11 having base member 12 and a peripheral containment wall 14, each preferably made of steel or aluminum and defining an interior volume 11v. Preferably, the container 11 is of a generally upright, cylindrical shape, with the axis AX of the cylinder generally aligned with vertical axis in an upright manner. More preferably, the container 11 further comprises a top member or roof 15, which is also preferably made of steel or aluminum, to substantially cover and enclose the interior volume 11v of the container.

The container 11 is a non-pressurized vessel, is open to atmosphere and preferably comprises vent openings 16 near its top to provide sufficient venting so as to either prevent pressure build-up or the creation of a vacuum in the interior volume 11v during operations. Vent openings 16 are preferably placed at the top of the peripheral containment wall 14. Preferably, the container defines a total interior volume 11v of 400 barrels (bbl) or about 63.6 cubic meters. A traditional 400 bbl oilfield tank, commonly used in the oilfield industry for storage of fluids, makes a suitable container 11. More preferably, the apparatus 10 is mounted on a supporting platform, which could be a skid (not shown).

The container 11 is provided with one or more container inlets 11i and at least one container outlet 11o. Preferably, the inlets 11*i* and outlets 11O comprise sealed valved connection points through the peripheral containment wall 14 to allow sealed connection of conventional hoses, pipes or the like (not shown) between the apparatus 10 and a fluid-hauler or vacuum truck (not shown) or between the apparatus 10 and an adjacent storage tank or the like, thereby facilitating either the filling with, or draining of, fluids into, or from, the interior volume 11*v*. In the embodiment shown in the figures, the container 11 is provided with a three inch diameter inlet 11*ia*, a six inch diameter inlet 1*ib* and a six inch diameter outlet 11*o*. Advantageously, and depending on the flow rate of contaminated fluid F that is being treated, an appropriate sized inlet or outlet can be easily utilized.

Figure 3B:
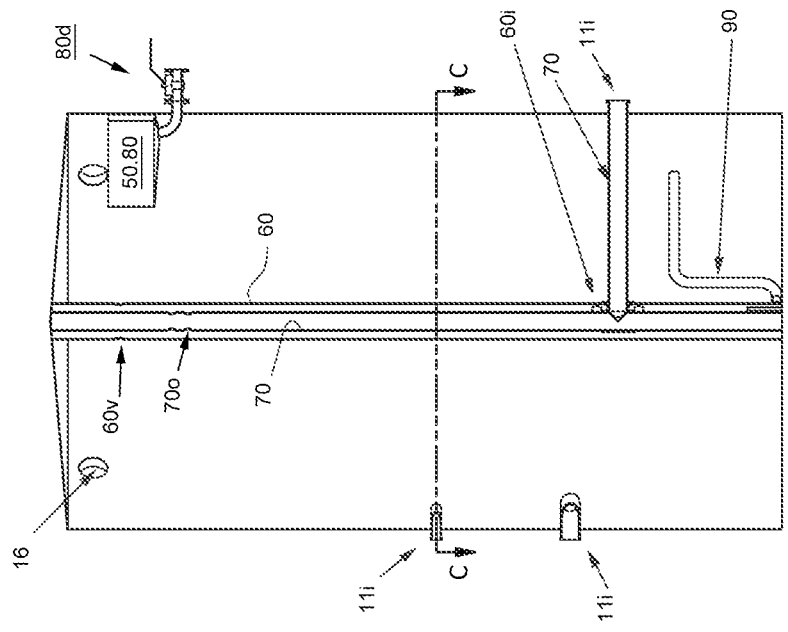
Figure 3A:
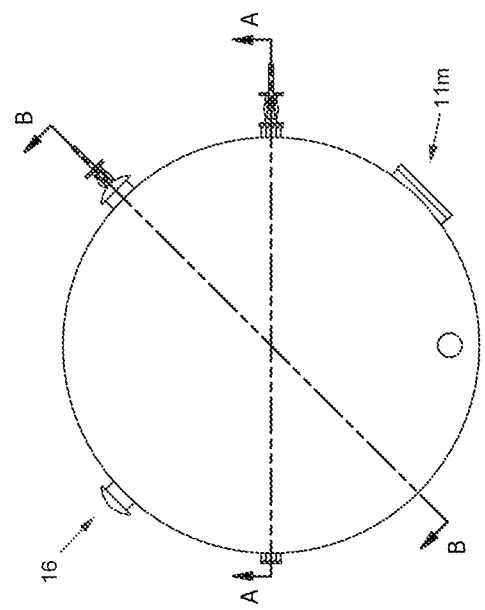
Figure 3D:
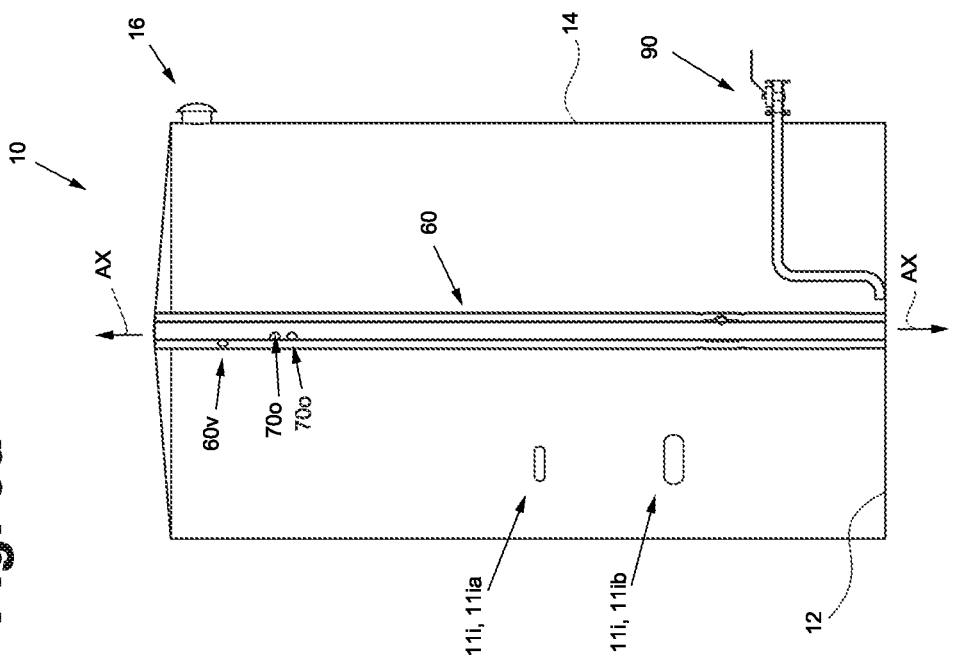
Figure 3C:
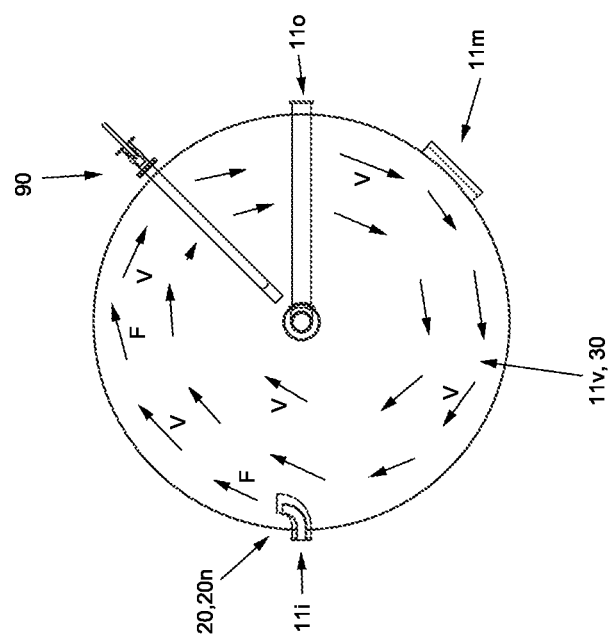
FIG. 3c is a sectioned top view of the embodiment of FIG. 1a along line C-C of FIG. 3b.
Figure 4F:
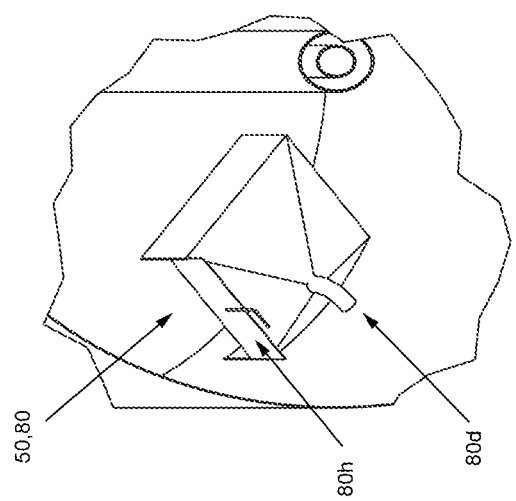
FIG. 4f is an enlarged view of the circled area G in FIG. 4e.
Figure 4E:
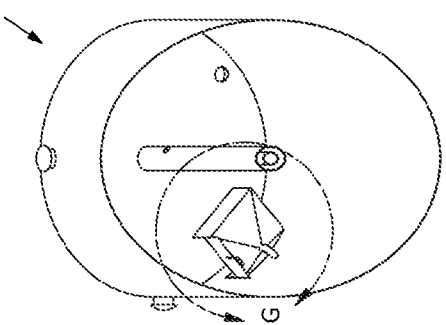
FIG. 4e is a sectioned perspective view of the embodiment of FIG. 1a along line F-F of FIG. 4d.
Figure 4D:
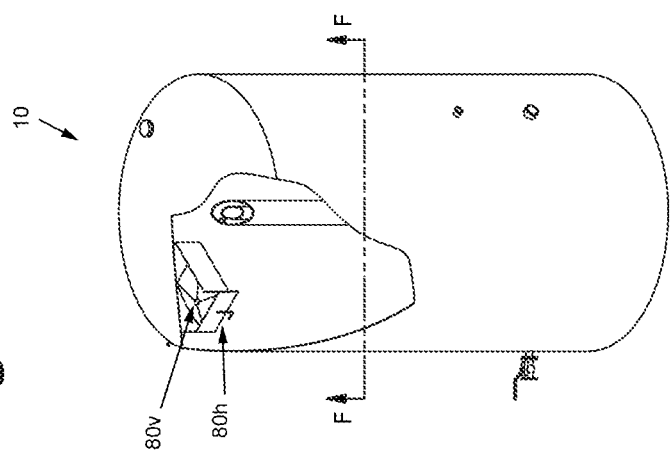
Figure 5B:
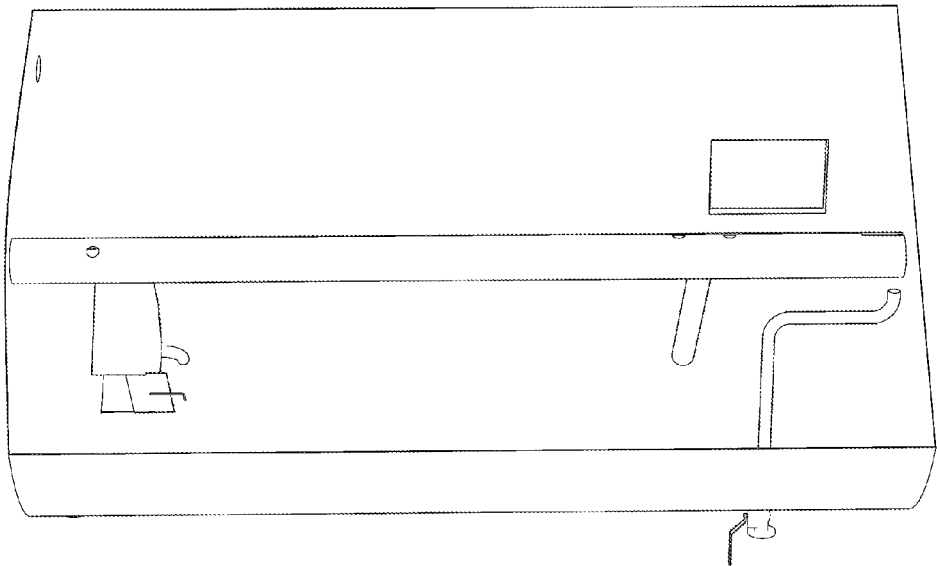
Figure 5A:
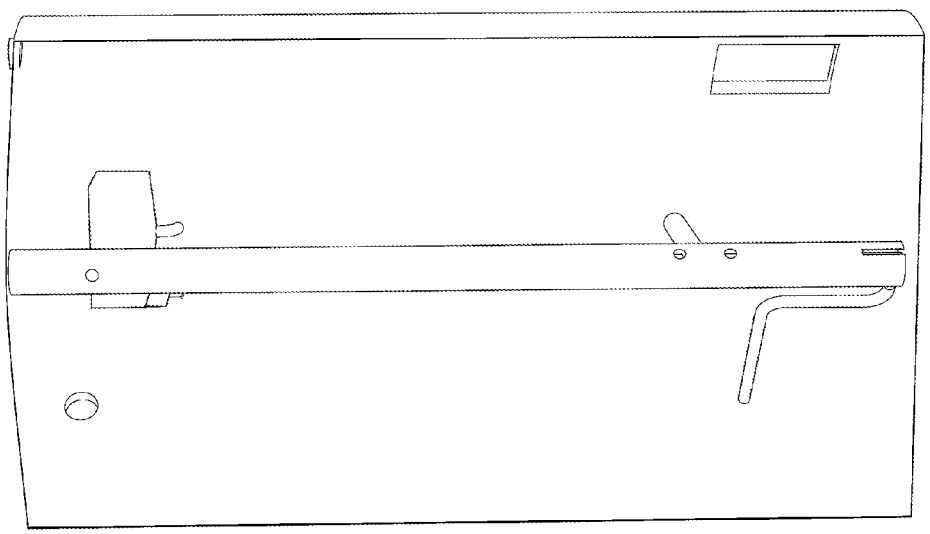
Figure 5C:
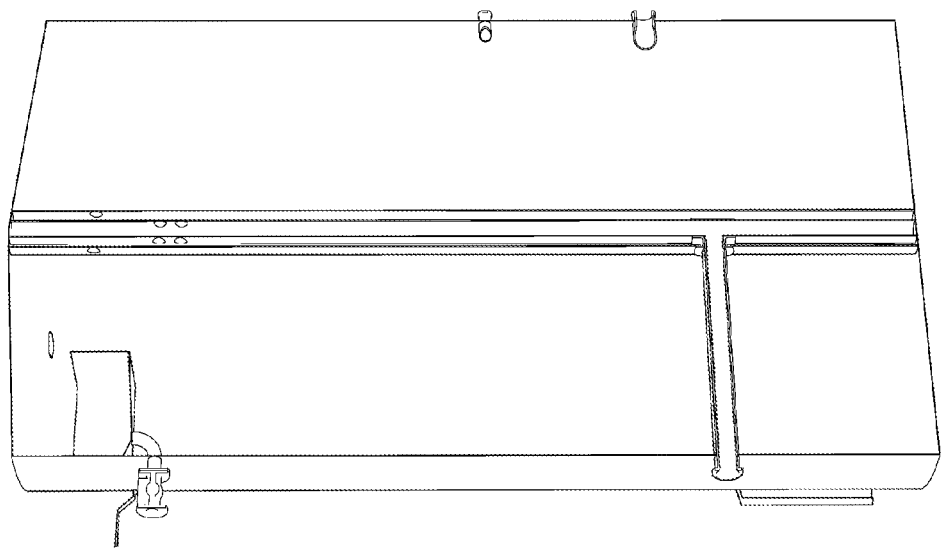

Preferably the one or more inlets 11*i* are provided with vortex flow means 20 to direct the contaminated fluid F in a circular path V around the container's axis AX within the interior volume 11*v* (see FIG. 3*c*). In a preferred embodiment, the vortex flow means 20 comprises an angled spout or nozzle 20*n* which directs the flow of contaminated fluid F in a vortex V or whirlpool like manner around the container's axis AX. The nozzle 20*n* becomes especially effective at directing the contaminated fluid F into a vortex V once the surface SF of the contaminated fluid F is above the level of the inlet 11*i* that being used to fill the interior volume (see, FIGS. 6*c*-6*e*). In alternate embodiments (not shown) the vortex flow means 20 comprises baffles or flow-directing vanes or panels.

By directing the contaminated fluid in a V flow manner around the axis AX of the container 11, the contaminated fluid F at the center of the container 11 spins at relatively high speed, while the more recently entered contaminated fluid F at the perimeter spins more slowly. Advantageously, the more recently entered (into the container 11) contaminated fluid F will have a long and slow path, providing time for denser (than water) contaminants DC, such as fracing gels, sands, proppants and other suspended solids, to settle to the bottom of the container 11 as a sediment layer SL. More advantageously, any less dense (than water) contaminants LD, such as oil and other hydrocarbons, will rise to top of the surface SF leaving generally water W as the middle layer between the oil LD on top and the sediments SL on the bottom.

The contaminated fluid F is a little deeper at the perimeter and a little more shallow at the center, and the surface SF is not flat but will generally display a characteristic depression toward the axis of the spinning contaminated fluid F. At any elevation within the contaminated fluid F the pressure is a little greater near the perimeter of the container where the contaminated fluid F is a little deeper, than near the center. The fluid pressure is a little greater where the fluid speed is a little slower, and the pressure is a little less where the speed is faster. This creates a pressure gradient from the perimeter of the container toward the center. This pressure gradient provides the centripetal force necessary for the circular motion of each parcel of contaminated fluid F spinning within the container 11, which further aids the separation of dense contaminants DC from the contaminated fluid F.

The container 11 is divided into a number of distinct regions with distinct functionality with respect to contaminated fluid F treatment, namely a separation region 30, a water collection region 40 and an oil collection region 50. Preferably, the separation region 30 receives contaminated fluid F from the inlet 11*i* (via vortex flow means) and comprises the majority of the interior volume 11*v* around the periphery of the cylinder (so as to provide sufficient volume to allow separation of both denser contaminants DC and less dense contaminants from the contaminated fluid F). More preferably, the water region 40 comprises a smaller fraction of the interior volume 11*v*, does not receive fluid direction from the inlet 11*i* and is situated generally around the axis AX of the container 11. Even more preferably, the oil collection region 50 also comprises a smaller fraction of the interior volume 11*v*, also does not receive fluid directly from the inlet 11*i* and is situated at the top of the cylinder 11, also near the periphery of the container 11, but generally at the top range of the contaminated fluid's surface SF.

In the embodiment of FIGS. 1*a*-6*e*, the separation region 30 and water collection region 40 are separated by a generally cylindrical member or pipe 60 of smaller diameter than the container 11, and generally located in the center of the container 11 having its axis aligned substantially parallel to the container's axis AX. In this embodiment, and to simplify construction, pipe 60 runs the entire height of the container 11, sealably connecting to the base member 12 and also connecting to the roof 15 for support. In other embodiments (not shown) the separation regions 30 and water collecting region may be separated by other means, such as appropriately placed, walls, weirs, panels or other members. In other embodiments (also not shown), pipe 60 will still may be offset from the container's center while still having its axis aligned substantially parallel with the container's axis A.

At least one pipe inlet 60*i* is provided to provide fluid communication between the separation region 30 and the water collection region 40. Preferably, the at least one pipe inlet 60*i* is located at or near the middle of the container 11, above the top of the sediment layer SD, but below the bottom of the layer of less dense contaminants. Advantageously, during operation, only water W from the middle layer will enter the at least one pipe inlet 60*i*. In contrast, any oil in the less dense layer LD will be positioned well above the inlet 60*i*, while any sediments are positioned below the inlet 60*i* in the sediment layer SL. More preferably, the cross sectional area of the at least one pipe inlet 60*i* is equal to, or greater than, the cross sectional area of the largest inlet 11*i*, so as to allow as great a flow rate (of water W) from the separation region 30 into water region 40 as the flow rate (of contaminated fluid F) from the inlet 11*i* into the separation region 30.

Further in embodiment of FIGS. 1*a*-6*e*, a drain 70 is provided to drain separated water W from the water collection region 40 out of the container 11 via the outlet 11*o*. Preferably, the drain 70 is a pipe or similar conduit, having a smaller diameter than pipe 60, positioned concentrically within pipe 60 and having one or more drain openings 70*o*. Water collecting region 40 will therefore then be generally the annulus between drain 70 and pipe 60, with drain 70 providing fluid communication between the water collecting region 40 and the outlet 11*o*. Drain 70 is sealably connected to the outlet 11*o*, so as to keep the separated water W from remixing with the contaminated fluid F, sediment layer SL or the oil in the less dense contaminants LD. In the embodiment of FIGS. 1*a*-6*e*, a drain 70, drain 70 exits, sealably, through pipe 60 at approximately a right angle towards the outlet 11*o*. However, in other embodiments, not shown, drain 70 may exit in another manner or at another angle.

More preferably, the drain openings 70*o* is positioned at a height H along the container 11 that is at substantially the same height as the oil collection region 50, so as to thereby set the height of the layer of less dense contaminants LD to coincide with the level of the oil collection region 50 and ensure that the top surface of the middle layer of water W does not generally reach above the oil collection region. That is, assuming that the flow of contaminated fluid F into the container 11 is substantially the same as, or less than, the flow of water W out of the outlet, the height of the layer of less dense contaminants LD will be generally at about height H (see FIGS. 6d and 6e) which coincides to the lower end of the oil collection region 50.

Preferably, drain vent openings 60v are provided on pipe 60 at a level above the drain 70 (and hence height H), so as to further facilitate drainage of water W down drain 70 by providing atmospheric communication to the surrounding atmosphere via vent openings 16. More preferably, and so as to ensure that the rate of flow of water W out the drain 70 will not be slower than the rate of flow of contaminated fluid F entering the container 11 via the inlet 11i, the total cross sectional area of the drain 70 is at least equal to, if not greater than, the total cross sectional area of the pipe inlets 60i, which in turn is at least equal to or greater than the total cross sectional area of the largest container inlet 11i. Advantageous, this will ensure that the height H of the top of the water W layer does not reach into the oil collection region 50.

In the embodiment of FIGS. 1a-6e, an oil container or oil box 80 defines oil collection region 50. Preferably, oil box 80 made of plate steel or aluminum and prevent flow or transfer of contaminated fluid F or water W into said oil collection region 50. In this embodiment, oil box 80 comprises a container 80c having a peripheral containment wall 80p and a base member 80b with a sloped bottom aspect to it, each preferably made of steel or aluminum and defining an interior volume 80v which generally equates to the oil collection region 50. Preferably, peripheral wall 80p further comprises a height adjustable section 80h wherein the height of that particular section of peripheral wall 80p can be adjusted up or down, as may be desired during operations. More preferably, the height adjustable section 80h generally faces the incoming vortex flow V of the less dense contaminants LD, such as oil layered on the water W.

Figure 6B:
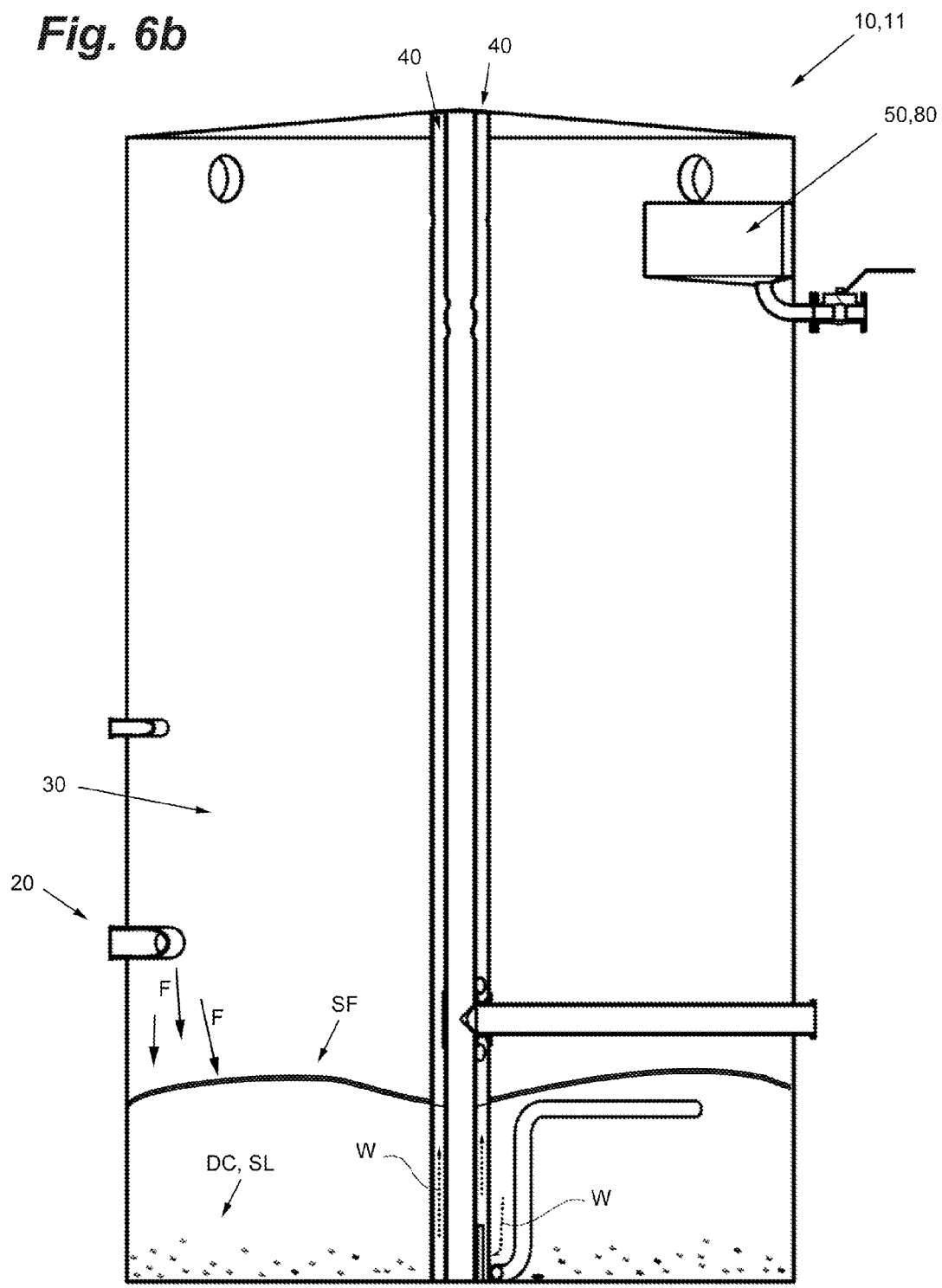
Figure 6C:
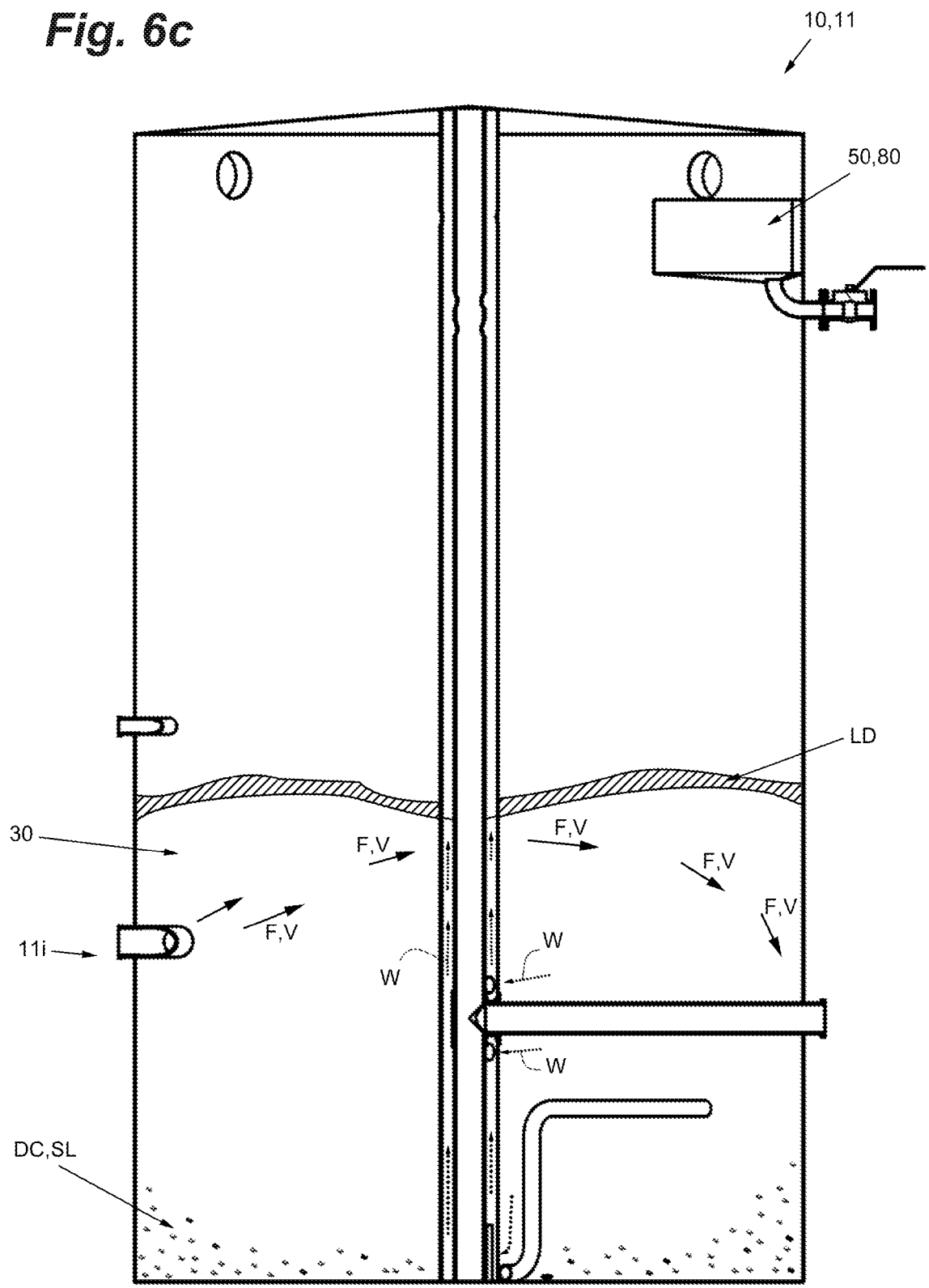
Figure 6D:
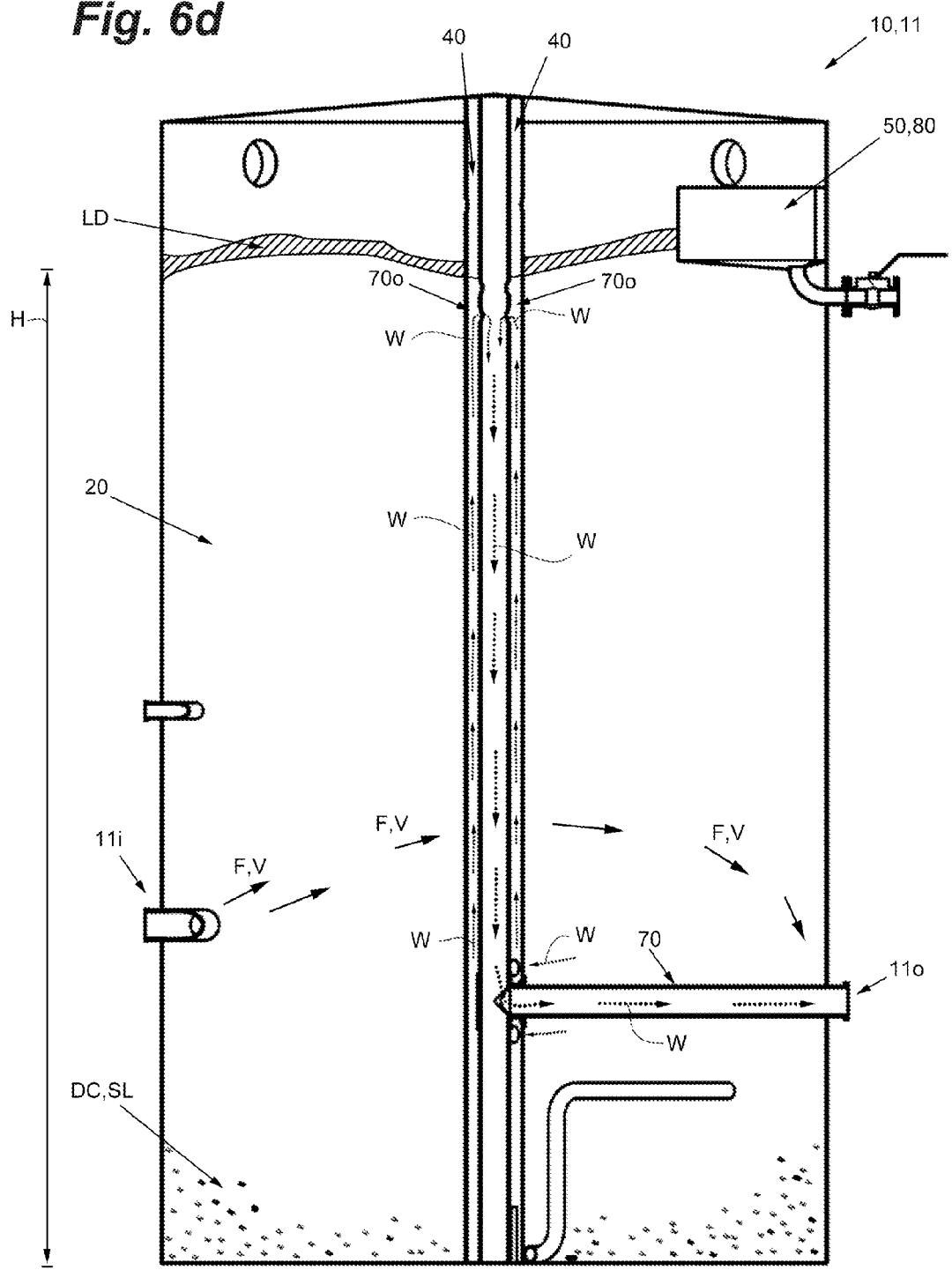
Figure 6E:
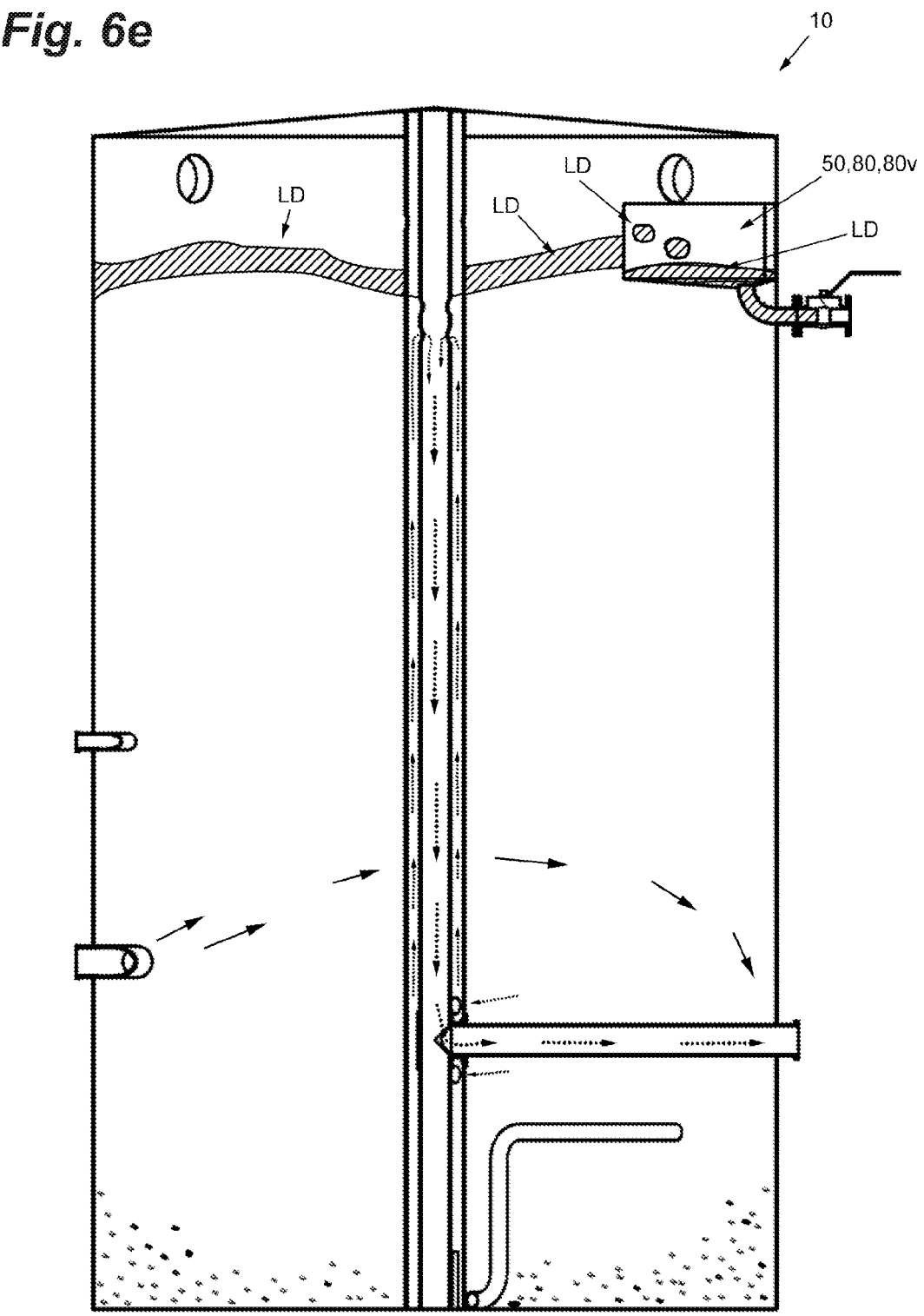

Advantageously, during operations, the layer of less dense contaminants LD will gradually increase, as these less dense contaminants LD separate from the contaminated fluid while the water W component of the contaminated fluid F will separate out in the middle and exit via the outlet 11o (via water collection region 40 and drain 70) and denser contaminants DC will separate out as a sediment lawyer SL on the base member 12 (see FIG. 6d). Once the layer of less dense contaminants LD, such as oil, has increased sufficiently to breach the peripheral wall 80p of the oil box 80, such contaminants will begin to slop over, or enter into, the oil box's interior volume 80v.

Preferably, oil box 80 is provided with a sealed valved connection points or valved drain 80d through the peripheral containment wall 14 to allow sealed connection of conventional hoses, pipes or the like (not shown) to facilitate drainage of less dense contaminants LD from the oil collection region 50 as may be desired during operations and to prevent over filing of the oil collection region 50. Alternatively, less dense contaminants LD may be periodically removed from the oil collection region 50, such as via vacuum truck and vacuum hose directed into the oil box via a port or opening (not shown) in the roof 15.

Preferably, sediment suction pipe 90 is provided as a sealed valved connection points through the peripheral containment wall 14 to allow sealed connection of conventional hoses, pipes or the like (not shown) to remove some or all of the sediment layer SL as it builds up during operations, such as via vacuum truck or the like. More preferably, the container 11 is provided with a removable and re-sealable hatch or manhole cover 11m to facilitate easy periodic maintenance of the interior volume 11v, including removal of built-up sediment layer SL, when the apparatus is not in operation (said cover 11m being normally closed and sealed, so as to prevent leakage of fluids out of the container 11.

As operations continue, a continuous separation of dense contaminants DC, less dense contaminants LD and water W from the contaminated fluid F is effected by the apparatus 10, while the level of water W generally remains at height H. Advantageously, the height adjustable section 80h of the oil box can be adjusted to select a particular height of less dense contaminants LD layer before these will spill or slop over into the oil box 80.

Advantageously, by utilizing a common 400 barrel oilfield tank as the container 11, the apparatus 10 can be made cheaply and efficiently and be effective for the typical volumes of contaminated fluid F encountered during oilfield operations. More advantageously, by treating the contaminated fluid F with the apparatus 10, the resultant water W portion will be cleaned of most (if not all) of the contaminants and, if necessary, can then be run through traditional membrane filtration units without prematurely clogging such membrane filters.

Example

In a preferred embodiment, and as shown generally in FIGS. 1a-6e, the apparatus 10 comprises a common 400 barrel oilfield tank as the container 11 measuring twenty-one feet high and having a twelve foot inside diameter, a three inch diameter first container inlet 11ia, a six inch diameter second container inlet 11ib, a six inch diameter container outlet 11o, a twelve inch diameter cylindrical member 60, a six inch drain 70, an approximate 24 inch×36 inch×48 inch sector forms the oil box 80, a four inch diameter valved drain 80d and a three inch sediment suction pipe 90. The first container inlet 11ia is positioned approximately halfway up the container (about 10 feet up from the base member 12), while the second container inlet 11ia is positioned approximately a quarter way up from the base member 12 (about 5.5 feet up from the base member 12). The container outlet 11o is positioned slightly lower than the second container inlet 11ia (about 4.5 feet up from the base member 12). The drain openings 70o is positioned at a height H of approximately 18 feet up along the container 11.

The separation region 30 in this embodiment is therefore the annular region between the container 11 and cylindrical member 60, from the base member 12 up to the level of the drain opening 70o. The separation region 30 therefore has a cross-sectional area of approximately 16,172 square inches and a volume of approximately 3,493,152 cubic inches (or 360 barrels). In contrast, the water region 40 in this embodiment is the annular region between cylindrical member 60 and the drain 70, from the base member 12 to the level of the drain opening 70o. The water region 40 therefore has a cross-sectional area of approximately 85 square inches and a volume of approximately 18,360 cubic inches (or just under 2 barrels). Therefore the ratio of both cross-sectional areas and volumes of the separation region 30 to the water region 40 is approximately 190 to 1. Also, the separation region 30 comprises approximately 90 percent of the interior volume 11v, while the water region 40 comprises approximately half a percent of the interior volume 11v. The oil collection region 50 is substantially equal to the interior volume 80v of the oil box 80, which like the water region 40 is only a few percent of the interior volume 11v.

Using this embodiment for treating contaminated fluids from oilfield operations, the inventors were able to treat contaminated fluid F at a rate of at least 6 barrels (bbls) per minute, produce separated water W at a similar rate (of 6 bbls/minute) and observed a reduction in the salinity of the contaminated fluids from approximately 7000 ppm down to a range of 250 ppm to 1000 ppm. Additionally, at one oil well site, the inventors were able to separate and remove over 1,500 barrels (bbls) of less dense contaminants LD, such as oil and other hydrocarbons, from the contaminated fluids F during a four-day operation of the apparatus 10. A significant quantity of denser contaminants DC was also observed to have formed into a sediment layer SL which was periodically removed during down-time via re-sealable hatch 11m.

Advantageously, the separated water W can be subsequently treated using conventional membrane filters, without risk of premature clogging. More advantageously, the recovered less dense contaminants LD, if being primarily oil and other hydrocarbons, can be sold and/or refined accordingly. Even more advantageously, the separated water W could be reused on-site in other oilfield operations, thereby reducing the need for fresh water to be hauled onto the site.

Those of ordinary skill in the art will appreciate that various modifications to the invention as described herein will be possible without falling outside the scope of the invention.

In the claims, the word "comprising" is used in its inclusive sense and does not exclude other elements being present. The indefinite article "a" before a claim feature does not exclude more than one of the features being present.

The embodiments of the invention in which an exclusive property or privilege is being claimed are defined as follows:

1. A fluid treatment apparatus for treating contaminated fluid comprising:
    a container having a base member and a peripheral containment wall and defining a total interior volume;
    at least one container inlet to receive said contaminated fluid into the total interior volume;
    at least one container outlet to discharge water out of the total interior volume;
    a separation region within the total interior volume and suitable to receive said contaminated fluid, to allow separation of said contaminated fluids into less dense contaminants, water and denser contaminants, and to store said denser contaminants as a sediment layer on the base member;
    a water collection region within the total interior volume and suitable to receive water from the separation region and direct said water to said at least one container outlet;
    an oil collection region within the total interior volume and suitable to receive less dense contaminants from the separation region;
    wherein the inlet discharges contaminated fluid into the total interior volume at a position that is substantially adjacent at least a section of the peripheral containment wall;
    wherein the container is a generally upright cylinder having a longitudinal axis;
    wherein said longitudinal axis is oriented substantially vertical;
    wherein the separation region and water collection region are separated by a generally cylindrical member of smaller diameter than the container; and
    wherein the generally cylindrical member has a longitudinal axis aligned substantially parallel to the longitudinal axis of the container.

2. The fluid treatment apparatus of claim 1, wherein the generally cylindrical member further comprises at least one pipe inlet to provide fluid communication between the separation region and the water collection region.

3. The fluid treatment apparatus of claim 2, wherein said at least one pipe inlet is located above any sediment layer and below any less dense contaminants.

4. The fluid treatment apparatus of claim 3, further comprising:
    a drain conduit, having a smaller diameter than said cylindrical member and positioned concentrically within said cylindrical member; and
    at least one drain opening in said drain conduit to provide fluid communication between the water collection region and said at least one container outlet.

5. The fluid treatment apparatus of claim 4, wherein said at least one drain opening is positioned at a height along the container that is at substantially the same height as the oil collection region.

6. The fluid treatment apparatus of claim 5, wherein the cylindrical member further comprises drain vent openings positioned at a level that is above said at least one drain opening.

7. The fluid treatment apparatus of claim 6, wherein the total cross sectional area of the drain conduit is at least equal to, if not greater than, the total cross sectional area of the at least one pipe inlet, and where the total cross sectional area of said at least one pipe inlet is at least equal to, if not greater than, the total cross sectional area of the at least one container inlet, so as to so ensure that the rate of flow of water out the drain conduit will not be slower than the rate of flow of water into the water collection region, nor slower than the rate of flow of contaminated fluid entering the container via the inlet.

* * * * *